US011955051B2

(12) United States Patent
Cheng

(10) Patent No.: US 11,955,051 B2
(45) **Date of Patent: *Apr. 9, 2024**

(54) RECEIVER OF DISPLAY DRIVER AND OPERATING METHOD THEREOF

(71) Applicant: Novatek Microelectronics Corp., Hsinchu (TW)

(72) Inventor: Huan-Teng Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,758

(22) Filed: Mar. 3, 2023

(65) Prior Publication Data

US 2023/0215332 A1 Jul. 6, 2023

Related U.S. Application Data

(63) Continuation-in-part of application No. 17/563,047, filed on Dec. 28, 2021, now Pat. No. 11,631,363.

(60) Provisional application No. 63/241,520, filed on Sep. 7, 2021.

(51) Int. Cl.
*G09G 3/20* (2006.01)

(52) U.S. Cl.
CPC ... *G09G 3/2092* (2013.01); *G09G 2310/0272* (2013.01); *G09G 2310/0291* (2013.01); *G09G 2330/021* (2013.01); *G09G 2340/0435* (2013.01); *G09G 2350/00* (2013.01); *G09G 2370/08* (2013.01); *G09G 2370/10* (2013.01)

(58) Field of Classification Search
CPC ......... G09G 3/2092; G09G 2310/0291; G09G 2330/021; G09G 2340/0435; G09G 2350/00; G09G 2370/08; G09G 2370/10
See application file for complete search history.

(56) References Cited

U.S. PATENT DOCUMENTS

| | | | | |
|---|---|---|---|---|
| 6,982,758 B2 * | 1/2006 | Rossi | H04N 25/00 348/308 |
| 7,742,091 B2 * | 6/2010 | Rossi | H04N 25/00 348/308 |
| 7,755,698 B2 * | 7/2010 | Galambos | H04N 23/651 348/222.1 |
| 8,217,615 B2 * | 7/2012 | Tan | G11B 19/28 318/400.26 |
| 10,009,199 B2 | 6/2018 | Suzuki et al. | |

(Continued)

FOREIGN PATENT DOCUMENTS

TW 201810996 3/2018

OTHER PUBLICATIONS

"Office Action of Taiwan Counterpart Application", dated Mar. 30, 2023, p. 1-p. 4.

*Primary Examiner* — Gene W Lee
(74) *Attorney, Agent, or Firm* — JCIPRNET

(57) ABSTRACT

A receiver of a display driver and an operating method of the receiver of the display driver are provided. The receiver of the display driver includes an input interface, an operational amplifier and a bias current control circuit. The input interface receives image data. The operational amplifier is coupled to the input interface and includes a bias current circuit. The bias current control circuit adjusts a bias current of the bias current circuit according to a data rate of the image data. The operating method is adapted to the receiver of the display driver.

8 Claims, 9 Drawing Sheets

(56) References Cited

U.S. PATENT DOCUMENTS

| | | | | |
|---|---|---|---|---|
| 2010/0309356 | A1* | 12/2010 | Ihara | H04N 25/677 348/300 |
| 2016/0035306 | A1* | 2/2016 | Park | G09G 3/3648 345/212 |
| 2016/0337152 | A1* | 11/2016 | Masui | H03B 5/1215 |
| 2017/0331651 | A1 | 11/2017 | Suzuki et al. | |

* cited by examiner

RECEIVER OF DISPLAY DRIVER AND OPERATING METHOD THEREOF

CROSS-REFERENCE TO RELATED APPLICATION

This application is a continuation-in-part application of and claims the priority benefit of a prior application Ser. No. 17/563,047, filed on Dec. 28, 2021, which claims the priority benefit of U.S. provisional application Ser. No. 63/241,520, filed on Sep. 7, 2021. The entirety of the above-mentioned patent application is hereby incorporated by reference herein and made a part of this specification.

BACKGROUND

Technical Field

The invention generally relates to a display driver. More particularly, the invention relates to a receiver of the display driver and its operating method adapted to MIPI HS-RX.

Description of Related Art

Mobile Industry Processor Interface (MIPI) has been widely spread in consumer electronics recently. For image processing applications, MIPI DSI (Display Serial Interface) defines a high-speed serial interface between a processor and a display module, and D-PHY of MIPI DSI is a high-speed source synchronous physical layer for mobile applications. D-PHY includes at least a low-power transmitter (LP-TX), a low-power receiver (LP-RX), a high-speed transmitter (HS-TX), and a high-speed receiver (HS-RX).

Traditionally, in a driver IC with high frame rate such as 120 hz, in order to design MIPI HS-RX to support the highest MIPI transmission speed, HSRX would be set to drive with high-speed reception capability which stands for high drive capability, high anti-interference and high bias current. However, if the driver IC with high frame rate is applied under scenarios with low frame rate or low bit rate, it leads to an excess power consumption since HSRX is fixed to high drive capability and high bias current.

SUMMARY

The invention is directed to a receiver of a display driver and an operating method of the receiver of the display driver, in which the bias current of HS-RX would be adjusted according to the data rate.

An embodiment of the invention provides a display driver. The receiver of the display driver includes an input interface, an operational amplifier and a bias current control circuit. The input interface receives image data. The operational amplifier is coupled to the input interface and includes a bias current circuit. The bias current control circuit adjusts a bias current of the bias current circuit according to the data rate of the image data.

An embodiment of the invention provides an operating method, which is adapted to a receiver of a display driver. The receiver includes an operational amplifier which has a bias current circuit. The operating method includes: receiving image data by the receiver of the display driver; and adjusting a bias current of the bias current circuit according to the data rate of the image data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
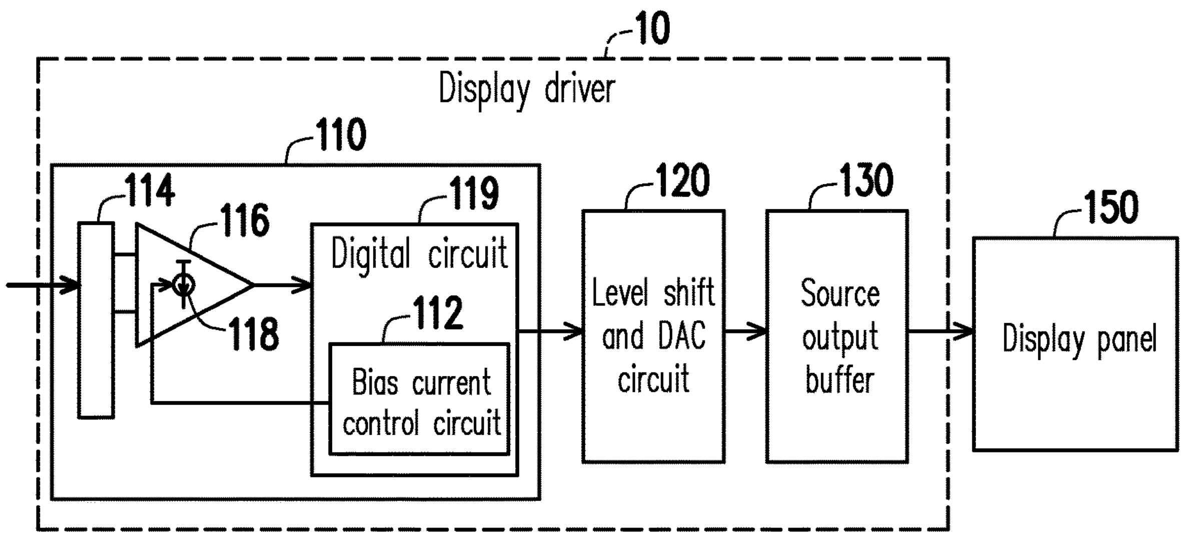
FIG. 1 is a schematic block diagram illustrating a display driver according to an embodiment of the invention.
Figure 2:
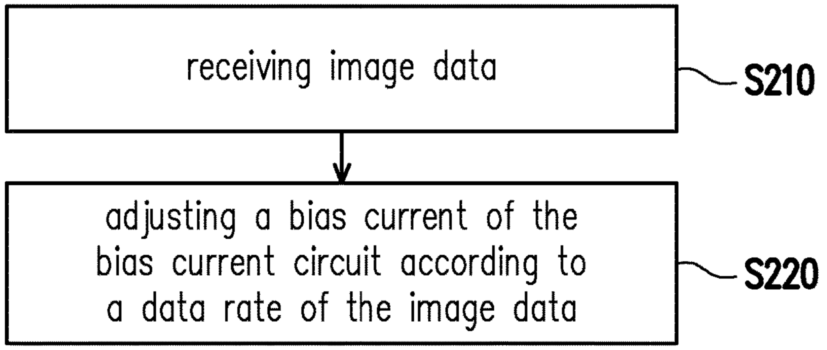
FIG. 2 is a flowchart illustrating an operating method of a receiver of a display driver according to an embodiment of the invention.

FIG. 1 is a schematic block diagram illustrating a display driver 10 according to an embodiment of the invention. FIG. 2 is a flowchart illustrating an operating method of a receiver of the display driver 10 according to an embodiment of the invention. Referring to FIG. 1 and FIG. 2, the display driver 10 at least includes a receiver 110 comprising a bias current control circuit 112 and a bias current circuit 118. In step S210, the receiver 110 receives image data. Next, in step S220, the bias current control circuit 112 adjusts a bias current of the bias current circuit 118 according to a data rate of the image data.

In the present embodiment, the receiver 110 may include a mobile industry processor interface (MIPI). On the other hand, the receiver 110 may include a MIPI high-speed receiver (HS-RX)(not drawn) and receive the image data from a MIPI high-speed transmitter (HS-TX)(not drawn). The receiver 110 at least includes an input interface 114, an operational amplifier 116 having a bias current circuit 118, and the bias current control circuit 112. The bias current control circuit 112 adjusts a bias current of the bias current circuit 118 of the operational amplifier 116 in the receiver 110 according to the data rate.

In one embodiment, the input interface 114 receives image data. The operational amplifier 116 is coupled to the input interface 114 and includes the bias current circuit 118. The bias current control circuit 112 adjusts a bias current of the bias current circuit 118 according to a data rate of the image data. Specially, in one embodiment, the data rate of the image data is a bit rate of the image data. The bit rate indicates the amount of bits of the image data transmitted per unit time. The detail of computing the bit rate will be described thereafter. In another embodiment, the data rate of the image data is a frame rate of the image data. In detail, when the image resolution is 1920*1080 and the frame rate is increased from 60 Hz to 120 Hz, the amount of data transmission is doubled in the same period of time. At this time, the bit rate needs to be increased to be sufficient for operation, and the bias current needs to be adjusted accordingly.

Furthermore, in one embodiment, the receiver 110 further includes a digital circuit 119, and the bias current control circuit 112 is included in the digital circuit 119. The digital circuit 119 is coupled to the operational amplifier 116 and receives and processes digital signals.

In one embodiment, the display driver 10 further includes a level shift and digital to analog converter (DAC) circuit 120 and a source output buffer 130. The level shift and DAC circuit 120 is coupled to the digital circuit 119, shifts the level of the digital signals and converts the digital signals to the analog signals. The source output buffer 130 is coupled to the level shift and DAC circuit 120 and outputs analog driving signals to drive pixels of the display panel 150 to display images.

In one embodiment, an information of the data rate is embedded in a data stream received by the receiver 110 of the display driver 10. In another embodiment, the information of the data rate is embedded in a data packet or control signals for register setting. In detail, the receiver 110 receives the data stream from a transmitter. It is worth noting that in addition to the data stream, the information sent by the transmitter may also include data rate information (data rate generally refers to information such as clock, bit rate, frame rate, etc.). The data rate information may contain protocol-specific packets or register setting. It saves the display driver 10 from calculating the data rate from the data stream, but uses the data rate information of the transmitter to directly control the bias current of the receiver 110 through the digital circuit.

Figure 3A:
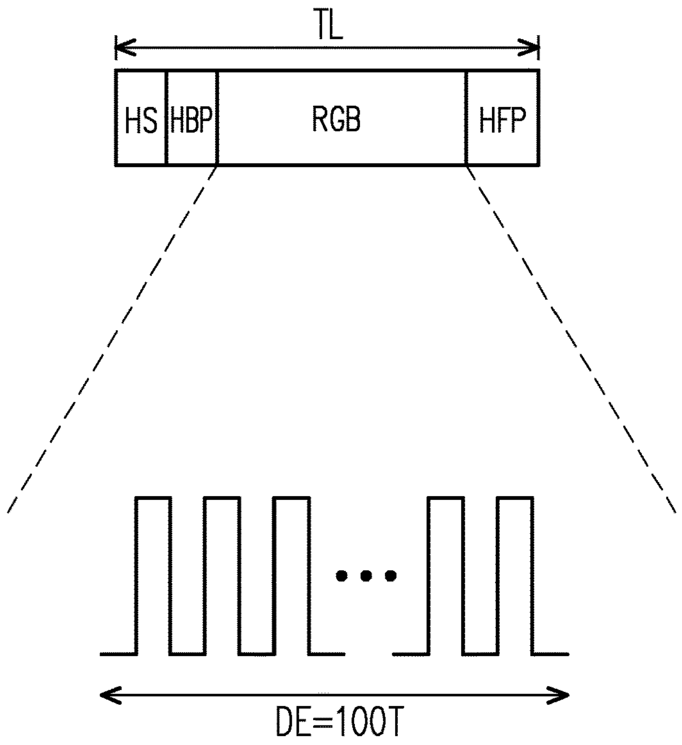
FIG. 3A is a timing diagram illustrating counting transmission time of pixel data under a non-burst mode according to an embodiment of the invention.
Figure 3B:
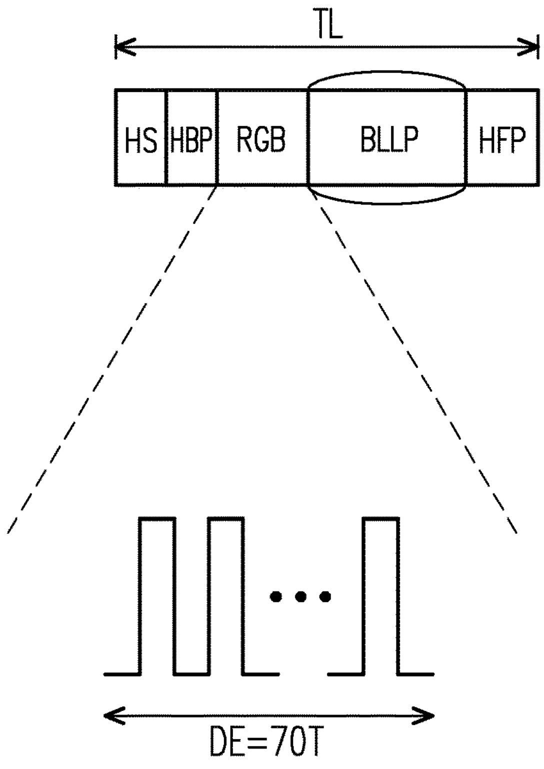
FIG. 3B is a timing diagram illustrating counting transmission time of pixel data under a burst mode according to an embodiment of the invention.

FIG. 3A is a timing diagram illustrating counting transmission time of pixel data under a non-burst mode according to an embodiment of the invention. FIG. 3B is a timing diagram illustrating counting transmission time of pixel data under a burst mode according to an embodiment of the invention. Referring to FIG. 3A and FIG. 3B, the bias current control circuit 112 counts transmission time DE of pixel data RGB in one of a plurality of display lines of the image data based on the clock signal, and computes the bit rate according to the transmission time DE. For example, under a non-burst mode shown in FIG. 3A, in the transmission time TL of a display line the bias current control circuit 112 receives a horizontal-sync packet HS, a horizontal back porch HBP, pixel data RGB and a horizontal front HFP. The bias current control circuit 112 counts the transmission time DE of pixel data RGB as 100 T (including 100 cycles of the clock signal). Assuming a period of the clock signal is 0.04 μs, the transmission time DE of pixel data RGB under the non-burst mode would be 4 μs. On the other hand, under a burst mode in FIG. 3B, the transmission time TL of a display line includes a horizontal-sync packet HS, a horizontal back porch HBP, pixel data RGB, a blank packet BLLP and a horizontal front HFP. The bias current control circuit 112 counts the transmission time DE of pixel data RGB as 70 T (including 70 cycles of the clock signal). Assuming a period of each cycle is 0.04p, the transmission time DE of pixel data RGB under the burst mode would be 2.8p.

Figure 4:
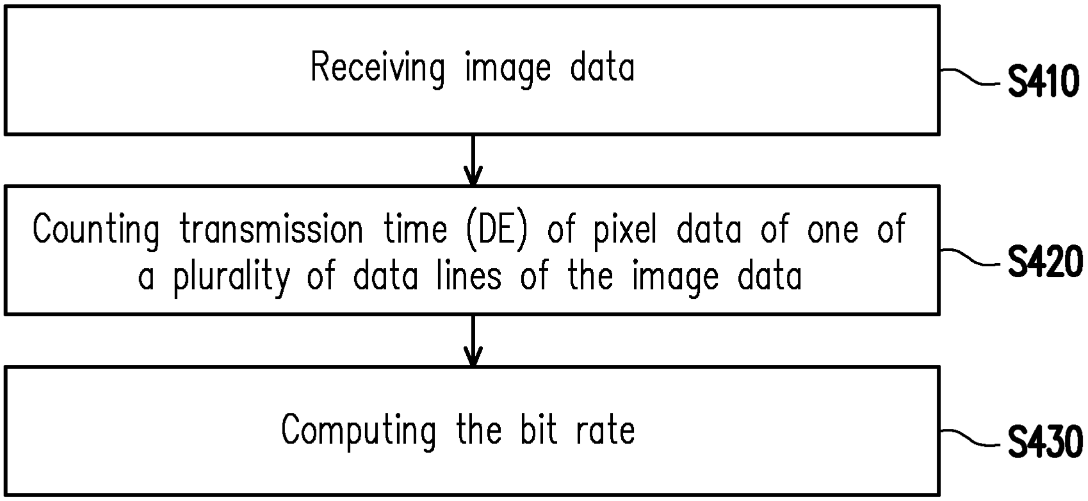
FIG. 4 is a flowchart illustrating computing a bit rate according to an embodiment of the invention.

FIG. 4 is a flowchart illustrating computing a bit rate according to an embodiment of the invention. In step S410, the receiver 110 receives image data. Next, in step S420, the bias current control circuit 112 counts the transmission time DE of pixel data RGB of one of a plurality of data lines of the image data. In step S430, the bias current control circuit 112 computes the MIPI bit rate (per lane) transmitted through single lane, shown as equation (1):

$$\text{MIPI bit rate per lane}=(H\_\text{resolution}*RGB\text{ bits})/(\text{MIPI lane number}*DE) \quad (1)$$

The H_resolution is a number of the pixels, the RGB bit is RGB bit number of each pixel, the MIPI lane number is the number of MIPI lane, and the DE is the transmission time DE of the pixel data RGB. For example, Giving transmission time DE as 4 μs, H_resolution as 720 pixels, number of RGB bits per pixel as 8(R)+8(G)+8(B)=24 bits, and Lane number as 4, the MIPI bit rate (per lane) would be computed as 1080 Mbps based on equation (1).

The bias current control circuit 112 inputs the computed bit rate into a lookup table Table 1 to generate a control signal S1 corresponding to the bit rate, and adjust the bias current of the bias current circuit 118 of the operational amplifier 116 in the receiver 110 according to the control signal S1. For example, if the bit rate is computed as 1150 Mbps, the bias current control circuit 112 would adjust the bias current to a Large HS-RX bias current setting.

TABLE 1

| MIPI bit rate (per lane) | HS-RX bias current setting |
|---|---|
| 1200~1300 Mbps | Very Large |
| 1100~1200 Mbps | Large |
| 1000~1100 Mbps | Medium High |
| 900~1000 Mbps | Medium |
| 800~900 Mbps | Medium Low |

Figure 10:
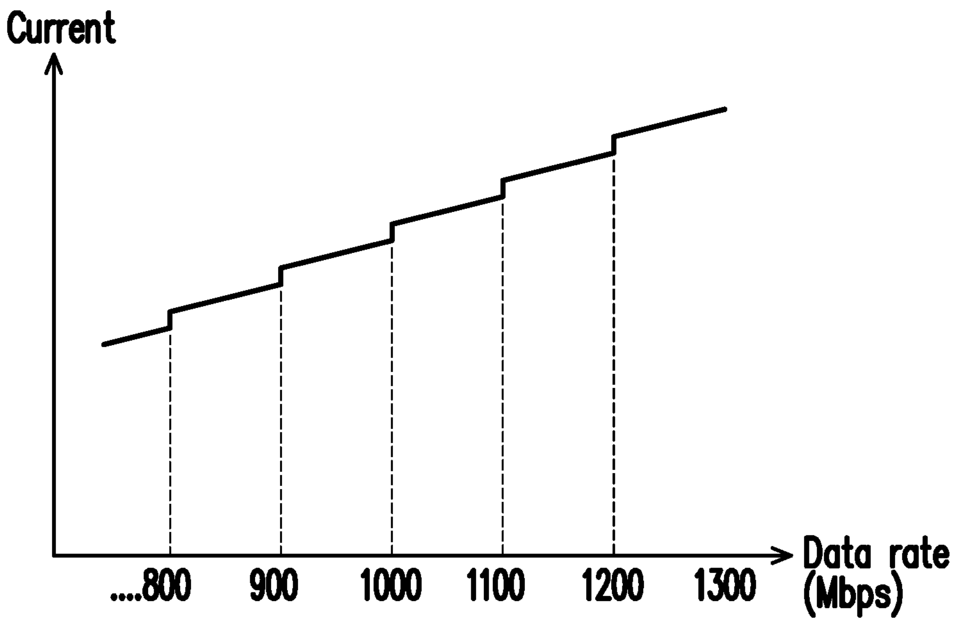
FIG. 10 is a curve diagram illustrating the data rate versus the bias current according to an embodiment of the invention.

Please refer to FIG. 10 at the same time, FIG. 10 is a curve diagram illustrating the data rate versus the bias current according to an embodiment of the invention. Combining FIG. 10 with the lookup table Table 1, the bias current is risen when the data rate is risen. In particular, the bias current shows discontinuous switching when the data rate is risen.

Figure 5:
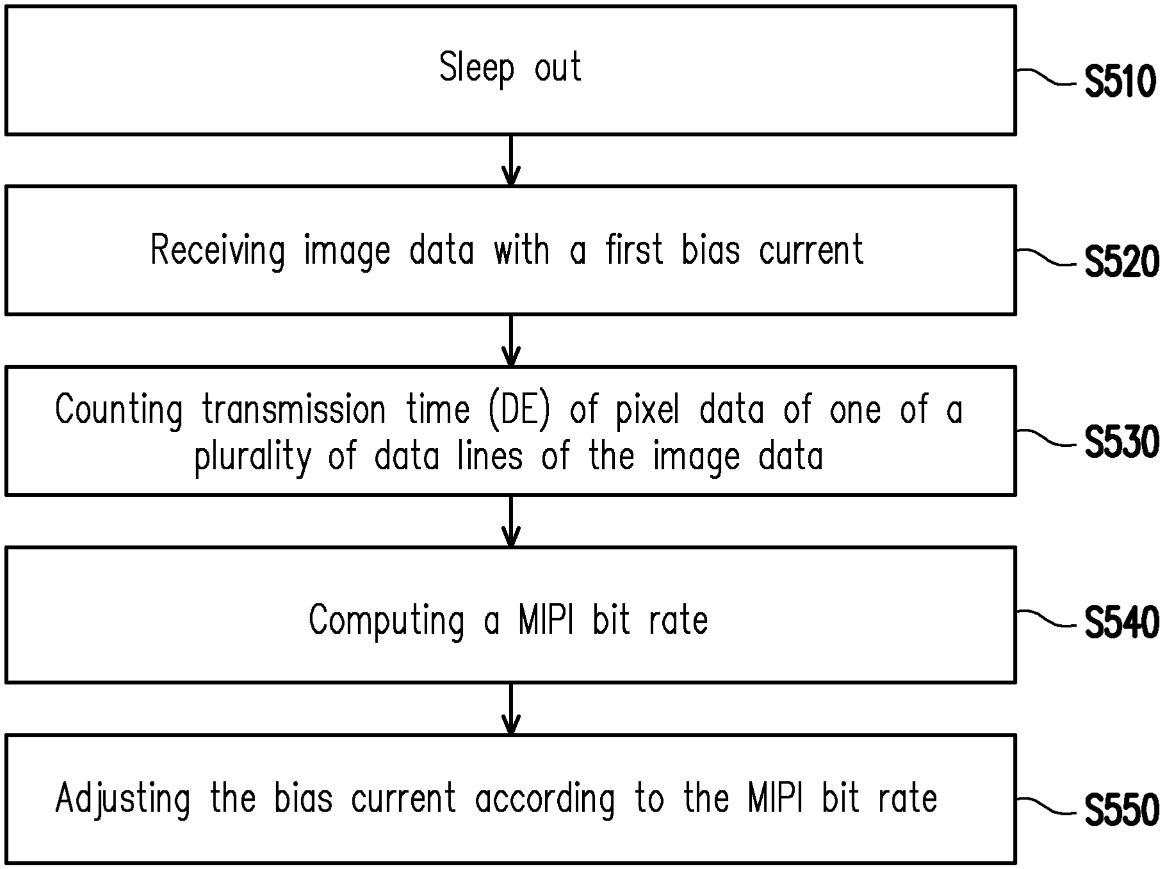
FIG. 5 is a flowchart illustrating an operating method of a display driver with one-time adjustment according to an embodiment of the invention.
Figure 6:
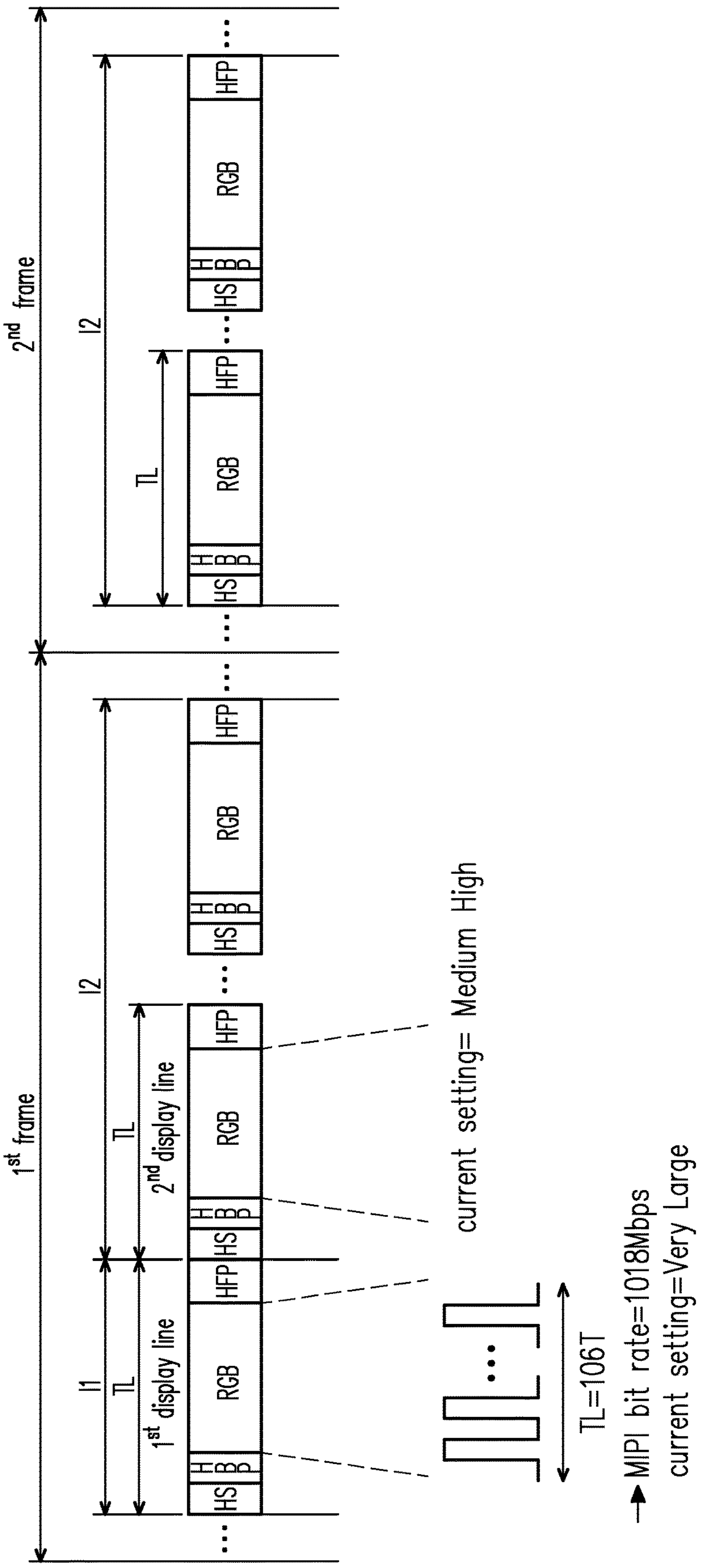
FIG. 6 is a timing diagram illustrating an operating method of a display driver with one-time adjustment according to an embodiment of the invention.

FIG. 5 is a flowchart illustrating an operating method of a display driver with one-time adjustment according to an embodiment of the invention. FIG. 6 is a timing diagram illustrating an operating method of a display driver with one-time adjustment according to an embodiment of the invention. Referring to FIG. 5 and FIG. 6, after sleeping out in step S510, the bias current control circuit 112 firstly sets a first bias current I1 for the first display line of the first frame, and receives the image data with the first bias current I1 in step S520, where the first bias current I1 would be the maximum HS-RX bias current setting as Very Large bias current setting defined in Table 1, in order to avoid receiving the first data incorrectly due to a faster bit rate with insufficient bias current in the beginning. Next, in step S530, the bias current control circuit 112 counts the transmission time DE of pixel data RGB of one of a plurality of data lines of the image data, such as 106 T. In step S540, the bias current control circuit 112 computes the MIPI bit rate (per lane) transmitted through single lane according to the counted transmission time DE, such as 1018 Mbps. Next, in step S550, the bias current control circuit 112 adjusts the bias current to a second bias current I2 corresponding to the computed MIPI bit rate in the beginning of the second display line, such as the Medium High HS-RX bias current setting shown in table 1. In this embodiment, the bias current control circuit 112 just adjusts the bias current once, thus the bias current would be fixed to the second bias current I2 after the first display line of the first frame. It is noted that the second bias current I2 must be less or equal to the first bias current I1.

Figure 7:
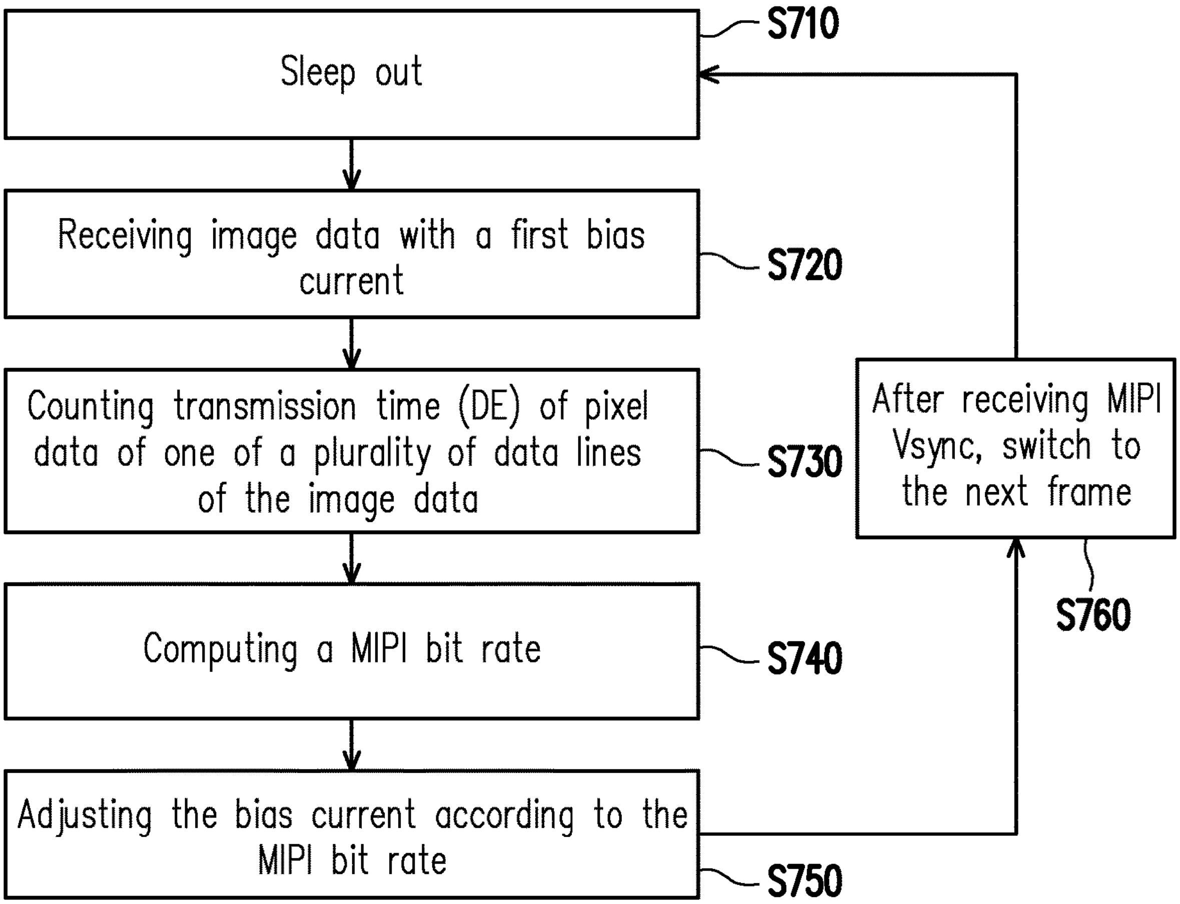
FIG. 7 is a flowchart illustrating an operating method of a display driver with dynamic adjustment under a fixed frame rate according to another embodiment of the invention.
Figure 8:
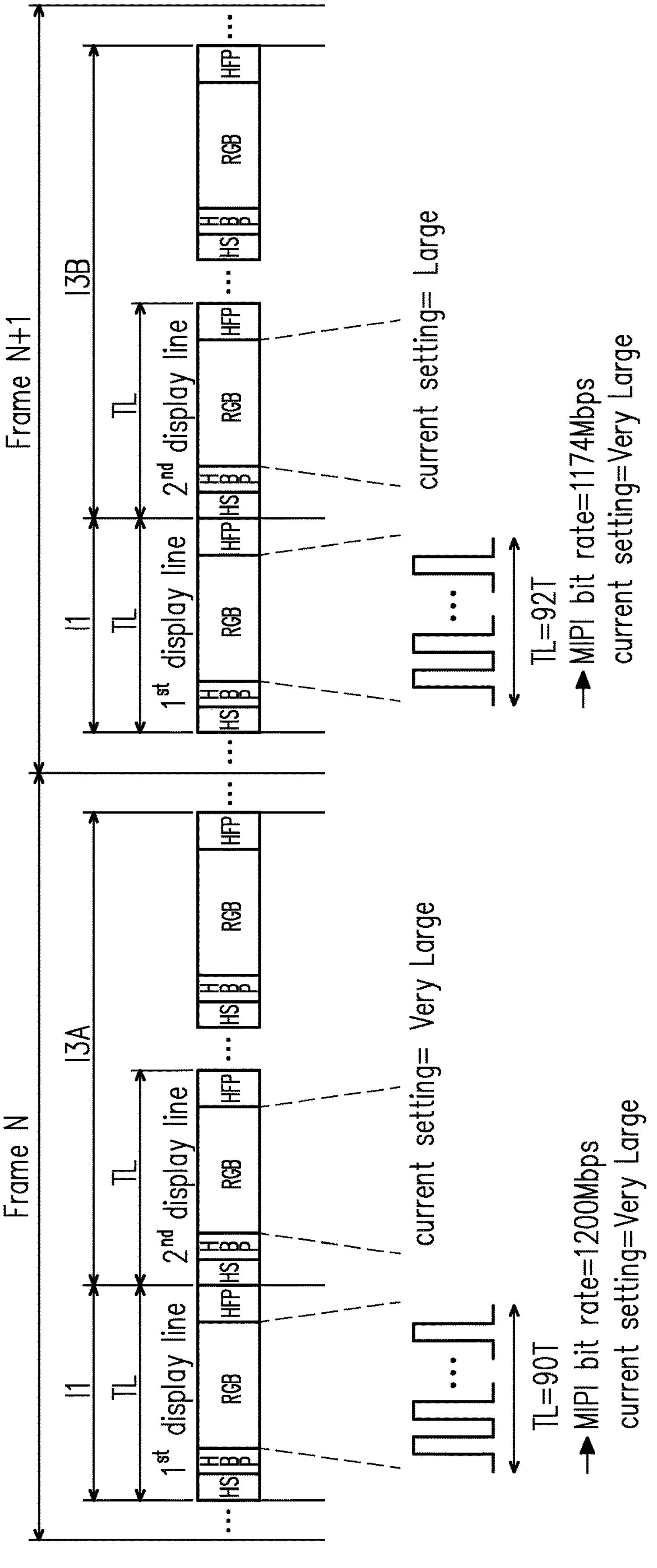
FIG. 8 is a timing diagram illustrating an operating method of a display driver with dynamic adjustment under a fixed frame rate according to another embodiment of the invention.

FIG. 7 is a flowchart illustrating an operating method of a display driver with dynamic adjustment under a fixed frame rate according to another embodiment of the invention. FIG. 8 is a timing diagram illustrating an operating method of a display driver with dynamic adjustment under a fixed frame rate according to another embodiment of the invention. Referring to FIG. 7 and FIG. 8, after sleeping out in step S710, the bias current control circuit 112 firstly sets the first bias current I1 for the first display line of the frame N, and receives the image data with the first bias current I1 in step S720, where the first bias current I1 would be the maximum HS-RX bias current setting as Very Large bias current setting defined in Table 1. Next, in step S730, the bias current control circuit 112 counts the transmission time DE of pixel data RGB of one of a plurality of data lines of the image data, such as 90 T. In step S740, the bias current control circuit 112 computes the MIPI bit rate (per lane) transmitted through single lane according to the counted transmission time DE, such as 1200 Mbps. Next, in step S750, the bias current control circuit 112 adjusts the bias current to a third bias current I3A corresponding to the computed MIPI bit rate in the beginning of the second display line, such as Very Large HS-RX bias current setting shown in table 1. In step S760, the bias current control circuit 112 switches from the frame N to the frame N+1 after receiving a MIPI Vsync (not drawn). In the frame N+1, the bias current control circuit 112 sets the first bias current I1 for the first display line of the frame N+1, and receives the image data with the first bias current I1. Then, the bias current control circuit 112 counts the transmission time DE of pixel data RGB of one of a plurality of data lines of the image data, such as 92 T. The bias current control circuit 112 computes the MIPI bit rate (per lane) transmitted through single lane according to the counted transmission time DE, such as 1174 Mbps. The bias current control circuit 112 adjusts the bias current to the third bias current I3B corresponding to the computed MIPI bit rate in the beginning of the second display line, such as Large HS-RX bias current setting shown in table 1. It is noted that third bias current I3A and I3B must be less or equal to the first bias current I1.

Figure 9:
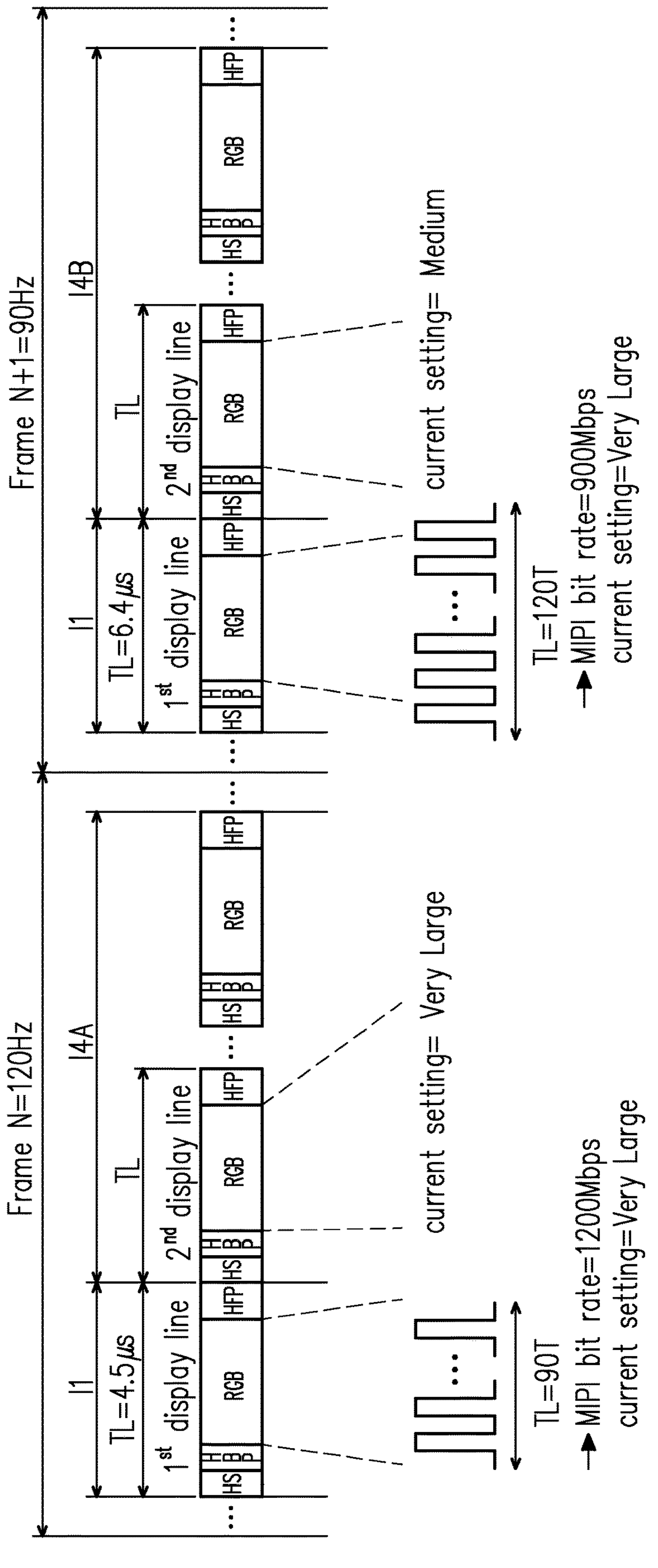
FIG. 9 is a timing diagram illustrating an operating method of a display driver with dynamic adjustment under a non-fixed frame rate according to another embodiment of the invention.

FIG. 9 is a timing diagram illustrating an operating method of a display driver with dynamic adjustment under a non-fixed frame rate according to another embodiment of the invention. This embodiment works under some applications with non-fixed frame rates, such as a dynamic switching high/low frame rate application, and the high/low frame rates would be switched by adjusting the transmission time TL of the display lines. In this embodiment, the adjustment flow of the bias current is similar with FIG. 8, in which the bias current control circuit 112 adjusts the bias current to fourth bias current I4A during the second display line of the frame N and to fourth bias current I4B during the second display line of the frame N+1. The difference between FIG. 9 and FIG. 8 shows that the transmission time TL of the display lines and the MIPI bit rate would be changed according to the frame rate, thereby the HSRX driving capability of the driving IC would be adjusted. For example, in FIG. 9, the transmission time TL of Frame N (120 Hz) is 4.5 μs, and the transmission time TL of Frame N+1 (90 Hz) is 6.4 μs which leads to a longer transmission time DE of pixel data RGB. In the frame N, the transmission time DE is counted as 90 T, the MIPI bit rate (per lane) is computed as 1200 Mbps, and the bias current control circuit 112 adjusts the bias current to a fourth bias current I4A corresponding to the computed MIPI bit rate in the beginning of the second display line of the frame N, such as Large HS-RX bias current setting shown in table 1. In the frame N+1, the transmission time DE is counted as 120 T, the MIPI bit rate (per lane) is computed as 900 Mbps, and the bias current control circuit 112 adjusts the bias current to a fourth bias current I4B corresponding to the computed MIPI bit rate in the beginning of the second display line of the frame N+1, such as Medium HS-RX bias current setting shown in table 1. It is noted that fourth bias current I4A and I4B must be less or equal to the first bias current I1. Therefore, MIPI bit rate would be reduced for setting a less bias current under scenarios with low frame rate, so as to achieve the power saving.

Based on above, in the embodiments of the invention, the bias current of HS-RX would be adjusted once or in every frame according to a computed bit rate. Therefore, the excess power consumption could be saved since the bias current would dynamically adjusted for low bit rate.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A receiver of a display driver, comprising:

an input interface to receive image data;

an operational amplifier coupled to the input interface, comprising a bias current circuit; and a bias current control circuit to adjust a bias current of the bias current circuit according to a bit rate of the image data.

2. The receiver of the display driver as claimed in claim 1, wherein an information of the data rate is embedded in a data stream received by the receiver of the display driver.

3. The receiver of the display driver as claimed in claim 1, wherein an information of the data rate is embedded in a data packet or control signals for register setting.

4. The receiver of the display driver as claimed in claim 1, wherein the bias current is risen when the data rate is risen.

5. An operating method of a receiver of a display driver, the receiver comprising an operational amplifier which has a bias current circuit, the operating method comprising:

receiving image data by the receiver of the display driver; and adjusting a bias current of the bias current circuit according to a bit rate of the image data.

6. The operating method of the receiver of the display driver as claimed in claim 5, wherein an information of the data rate is embedded in a data stream received by the receiver of the display driver.

7. The operating method of the receiver of the display driver as claimed in claim 5, wherein an information of the data rate is embedded in a data packet or control signals for register setting.

8. The operating method of the receiver of the display driver as claimed in claim 5, wherein the bias current is risen when the data rate is risen.

* * * * *